(12) United States Patent
Twigg

(10) Patent No.: US 7,141,226 B2
(45) Date of Patent: Nov. 28, 2006

(54) LIGHT-DUTY DIESEL CATALYSTS

(75) Inventor: Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 130 days.

(21) Appl. No.: 10/204,020

(22) PCT Filed: Feb. 15, 2001

(86) PCT No.: PCT/GB01/00601

§ 371 (c)(1),
(2), (4) Date: Oct. 23, 2002

(87) PCT Pub. No.: WO01/61163

PCT Pub. Date: Aug. 23, 2001

(65) Prior Publication Data

US 2003/0114300 A1    Jun. 19, 2003

(30) Foreign Application Priority Data

Feb. 15, 2000  (GB)  ................................ 0003405.8

(51) Int. Cl.
*B01J 8/02*  (2006.01)
(52) U.S. Cl. .............. 423/213.2; 502/300; 502/527.17; 502/527.19
(58) Field of Classification Search ............. 423/213.2; 502/527.11, 527.16, 527.17, 527.19, 300
See application file for complete search history.

(56) References Cited

U.S. PATENT DOCUMENTS

| 3,896,616 A | 7/1975 | Keith et al. |
| 5,108,716 A | 4/1992 | Nishizawa |
| 5,506,028 A | 4/1996 | Brück |
| 5,549,873 A * | 8/1996 | Pott ............................ 422/180 |
| 5,599,509 A | 2/1997 | Toyao et al. |
| 6,087,298 A * | 7/2000 | Sung et al. ................. 502/333 |
| 6,827,909 B1 | 12/2004 | Brück et al. |

FOREIGN PATENT DOCUMENTS

| CA | 2103647 | 3/1999 |
| DE | 198 20 971 | 11/1999 |
| DE | 198 20 971 A1 | 11/1999 |
| EP | 0 976 916 | 2/2000 |
| EP | 0 976 916 A2 | 2/2000 |
| EP | 0 976 916 A3 | 2/2000 |
| GB | 2 313 796 | 12/1997 |
| WO | WO-93/20339 | 11/1993 |
| WO | WO-97/43035 | 11/1997 |

OTHER PUBLICATIONS

International Search Report dated Jul. 27, 2001.
British Search Report dated Jan. 31, 2001.

* cited by examiner

*Primary Examiner*—Edward M. Johnson
(74) *Attorney, Agent, or Firm*—RatnerPrestia

(57) ABSTRACT

An oxidation catalyst for a light-duty diesel vehicle comprising a first upstream part (2) and a second downstream part (3) of high heat capacity relative to the first part, each part comprising a substrate and a catalyst support coated thereon. With this arrangement the diesel catalyst can reach light-off temperature more quickly and retain sufficient heat to maintain light-off temperature for substantially longer than conventional diesel catalyst arrangements.

13 Claims, 3 Drawing Sheets

LIGHT-DUTY DIESEL CATALYSTS

This application is the U.S. national phase application of PCT International Application No. PCT/GB01/00601.

The present invention concerns diesel catalysts and in particular catalysts for light-duty diesel applications.

In order to meet existing and future emissions legislation for nitrogen oxides (NOx), carbon monoxide (CO), hydrocarbons (HC) and particulate matter, exhaust systems for vehicle internal combustion engines typically include one or more catalysts for converting one or more of these exhaust gas components to less environmentally harmful species.

Three-way catalysts (TWC) are used in exhaust systems for gasoline engines that run essentially at a stoichiometric air-to-fuel ratio (about 14.7 to 1). TWCs generally include an oxidation catalyst, such as platinum and/or palladium, to oxidise CO to $CO_2$ and HC to $CO_2$ and $H_2O$; and a reduction catalyst, principally rhodium, to catalyse the reduction of NOx to $N_2$.

More recently, more fuel-efficient gasoline direct injection (GDI) engines have been developed. These engines run on a leaner air-to-fuel ratio of up to about 30 to 1. TWCs are inappropriate in GDI applications because the exhaust gas composition includes an excess of oxygen and oxidising species. Reduction of NOx to $N_2$ is difficult in such an environment. The preferred method for treating GDI exhaust gases is to position a TWC close to the engine exhaust manifold (the so-called close-coupled position) and to use a NOx absorber/catalyst or NOx trap. The NOx trap typically includes three components: an oxidation catalyst, such as platinum, for oxidising NO to $NO_2$; a NOx storage component, e.g. a barium-based compound, which in its un-reacted state, depending on the environment, is present as the oxide, carbonate or hydroxide, to react with the $NO_2$ to form the nitrate and thereby "store" the NOx; and a reduction catalyst, such as rhodium for catalysing the reduction of $NO_2$ to $N_2$.

The GDI engine management unit is programmed to periodically run the engine stoichiometrically or slightly rich during its normal lean-burn operation. When the exhaust gas composition is lean, CO and HC are oxidised over the TWC and NOx is oxidised over the oxidation catalyst in the NOx trap and the resultant $NO_2$ is stored as the nitrate on the NOx storage component. Soon the capacity of the NOx storage component to store NOx will be exhausted. The nitrate form of the NOx storage component is, however, less stable in a stoichiometric or slightly reducing exhaust gas atmosphere and so the periodic enrichment of the air-to-fuel ratio enables the stored NOx to be released, thus regenerating the NOx storage capacity of the NOx trap. The released NOx is reduced in the stoichiometric or slightly rich environment over the reduction catalyst.

By contrast with gasoline engines, diesel engines are much more efficient, running at an air-to-fuel ratio of between about 30 and 50 to 1. They produce less CO, HC and NOx (about 500–600 ppm NOx compared with up to 4000 ppm) than gasoline engines, but a higher mass of particulate matter. The typical diesel oxidation catalyst comprises platinum on a support such as alumina and/or zeolite. No NOx storage or reduction catalyst component is present in a diesel oxidation catalyst formulation.

One of the greatest problems in treating exhaust gases from diesel engines, and in particular light duty diesel (LDD) engines (LDD engines are those used in passenger vehicles of up to about 3.5 tonnes weight in Europe as defined in 1992/21 EC and 1995/48 EC, or approximately 8500 pounds in weight in American States other than California), is that the exhaust gas temperature can drop below the light-off temperature for CO and/or HC during urban driving, i.e. after light-off has been achieved following cold-start, and this can cause a vehicle to fail the relevant emission test cycle limits for CO and/or HC. (The "light-off" temperature is the temperature at which a catalyst is 50% efficient to catalyse a reaction). This problem is recognised in European vehicle exhaust emission test cycle legislature, which includes a cooler ECE part to the cycle that mimics urban driving conditions to test for, among others, failure on CO and/or HC emissions.

By contrast, this problem does not exist for gasoline engines as the exhaust gas temperature is unlikely to drop below the light-off temperature for a catalyst after it has reached light-off following cold start.

The problem with temperature loss in diesel exhaust systems is particularly acute in two situations. Firstly, as a fuel economy measure, it is common practice to program diesel engine management units to cut-off the supply of fuel, e.g. the fuel injection, following lift-off from the accelerator. During fuel cut-off, only air flows through the exhaust system and this can cool a diesel catalyst to below its light-off temperature. Secondly, turbos are popular in diesel vehicles as they improve responsiveness, at a moderate fuel penalty and increase in NOx, to approaching that experienced with gasoline engines. However, a turbo removes heat from the exhaust gas and this can lead to a catalyst temperature dropping below light-off. In practice, where a turbo is present, the diesel oxidation catalyst is positioned as close as possible to the turbo to make use of any residual heat in the area surrounding the turbo turbine. It is not possible to position the catalyst upstream of the turbo for safety and technical reasons: if a part of the catalyst support were to break off and fall into the turbo turbine this would be extremely dangerous; and the presence of a turbo in an diesel exhaust system increases back pressure, coupled with a loss of fuel economy. If a catalyst substrate were to be positioned upstream of a turbo turbine, this would increase back-pressure yet further and could potentially result in sub-optimal turbo performance.

We have now found that by arranging the diesel catalyst between an upstream catalyst part and a downstream catalyst part of higher heat capacity than the upstream part, the catalyst can reach light-off temperature more quickly and can retain an above light-off temperature during e.g. urban driving more effectively than a conventional diesel catalyst arrangements.

A conventional diesel catalyst arrangement is, for example, a "single-brick" ceramic monolith coated with a support, such as alumina, which support supporting a platinum-based active material.

According to the present invention, there is provided an oxidation catalyst for a light-duty diesel vehicle comprising a first upstream part and a second downstream part of high heat capacity relative to the first part, each part comprising a substrate and a catalyst support coated thereon.

Important ways of adjusting the heat capacity of the catalyst parts are to choose the length of the catalyst substrate, the substrate cell density, the substrate cell wall thickness and/or the amount of active catalyst support applied to the substrate.

U.S. Pat. No. 5,108,716 describes a TWC having a first upstream TWC and a second downstream TWC having a higher heat capacity than the upstream TWC. The upstream TWC is so configured as to be suitable at low temperatures thereby to raise its activation promoting or warm-up characteristics, whereas the downstream catalyst is so configured as to be suitable at high temperatures thereby to maintain high exhaust gas purification performance at high temperatures. At high temperatures the dispersion of catalytic metals on the upstream catalyst is degraded and its performance is reduced. The document does not disclose the use of the described configuration for diesel applications, nor does it suggest the advantage of maintaining temperature in the catalyst system. This is not surprising, since it describes only a gasoline embodiment, which does not suffer the low exhaust gas temperature problems discussed above.

According to a first embodiment, the invention comprises a conventional flow-through monolith or "single-brick" coated from one end with a support (defining a catalyst first part) and at the other end coated with a support of high heat capacity relative to the first support. In this embodiment, the heat capacity of each support can be adjusted by using different loadings of the same support material, or different support materials for each coating. However, in preferred embodiments the first and second parts of the catalyst comprise physically separate substrates.

The thermal mass of the second part is preferably two times or greater that of the catalyst first part, preferably three times or greater, most preferably four times or greater.

Preferably, the first part of the catalyst comprises a through-flow catalyst support that has relatively thin cell wall thickness. It is known to offer thin wall thicknesses with high cell density catalysts, but it is presently believed that a moderately high cell density is appropriate for the first stage, for example a cell density of 300 to 900 cells per square inch (cpsi), preferably 300 to 600 cpsi. Suitable wall thicknesses are below 0.10 mm, preferably below 0.05 mm.

The first part of the catalyst may be either a metal or a ceramic substrate, providing it is of low heat capacity relative to the second catalyst part. Suitable substrates may be obtained commercially, although the combination of thin wall thickness with such cell densities is not common. Foil of 20-micrometer thickness, for example, could be used with advantage in minimising thermal mass. Conventional metals may be used, but the lower temperatures of such diesel exhaust gases may permit other metals than those conventionally used for catalyst supports used for gasoline engines. All or part of the first part may be conical or frusto-conical in shape (although the cells can remain of uniform cross-section and be arranged parallel to one another), rather than the conventional cylinder shape. In a conical or frusto-conical embodiment, the narrower end of the catalyst first part is preferably positioned upstream. The length of the catalyst first part, particularly if the substrate is metal, is an important parameter in optimising overall system performance. If too long, thermal conductance along the catalyst can prevent sufficiently rapid temperature increase in the front section of the catalyst.

The downstream part is of a greater heat capacity (or thermal mass), and conventional ceramic, usually cordierite, or metal, catalyst substrates having relatively thick cell walls compared to the conventional substrate are suitable. Thermal mass may, however, be provided in other ways: by the use of more unusual materials for the second part or by incorporating a mass of material within or surrounding the second stage catalyst. Thus, thermal mass may be added by incorporating a relatively massive metal sleeve around the main part of the substrate, or rods, sheets etc. within the substrate when the thermal conductivity of the substrate is sufficiently large. Suitable cell densities may be from 100 to 900 cpsi, preferably 200 to 600 cpsi. Suitable wall thicknesses are greater than 0.10 mm, preferably 0.15 mm or greater.

The first and second parts of the catalyst need not be identical in shape or size, and this may contribute to achieving the desired differences in thermal capacity. For example, it may be desirable to use a shorter, smaller diameter, first part than the second part.

In general, it is preferred to insulate the catalyst and pipes leading to it; it may be preferred in certain designs to use greater insulation surrounding the second part.

Although it is possible to have more than two parts to the catalyst according to the invention, cost considerations will usually mean that only two parts are used.

The composition of the catalyst is not critical to the present invention, and can be chosen by conventional experiment according to the other requirements of the system and the engine and exhaust system details. However, a platinum-based catalyst formulation, or formulations, having low light-off characteristics are preferred and should be selected for all of the catalyst parts, to enhance the effects of thermal optimisation.

According to a further aspect of the invention, there is provided a light-duty diesel vehicle including an exhaust system according to the invention.

In a further aspect, the invention provides the use of an oxidation catalyst according to the invention in a light-duty diesel vehicle to achieve rapid CO and/or HC light-off from cold-start relative to a conventional catalyst substrate and support combination and maintaining catalyst temperature substantially above the CO and/or HC light-off temperature after warm-up during urban driving.

The invention is further described with reference to the accompanying drawings, in which.

Figure 1:
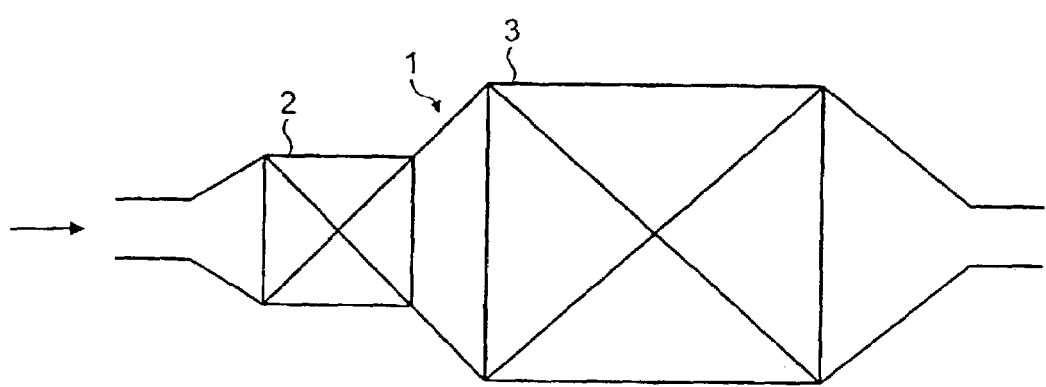
FIG. 1 is a schematic drawing of a catalytic converter according to the invention.

Referring to FIG. 1, a catalytic converter for a light-duty diesel vehicle is contained within an insulated metal housing, 1. The catalyst would conventionally be a "single-brick" or substrate. According to an embodiment of the present invention, a catalyst first part, 2, is carried on a low thermal mass 400 cpsi metal support having a wall thickness of 0.05 mm. A catalyst second part, 3, is carried on a higher thermal mass 300 cpsi cordierite support having a wall thickness of 0.15 mm.

Figure 2:
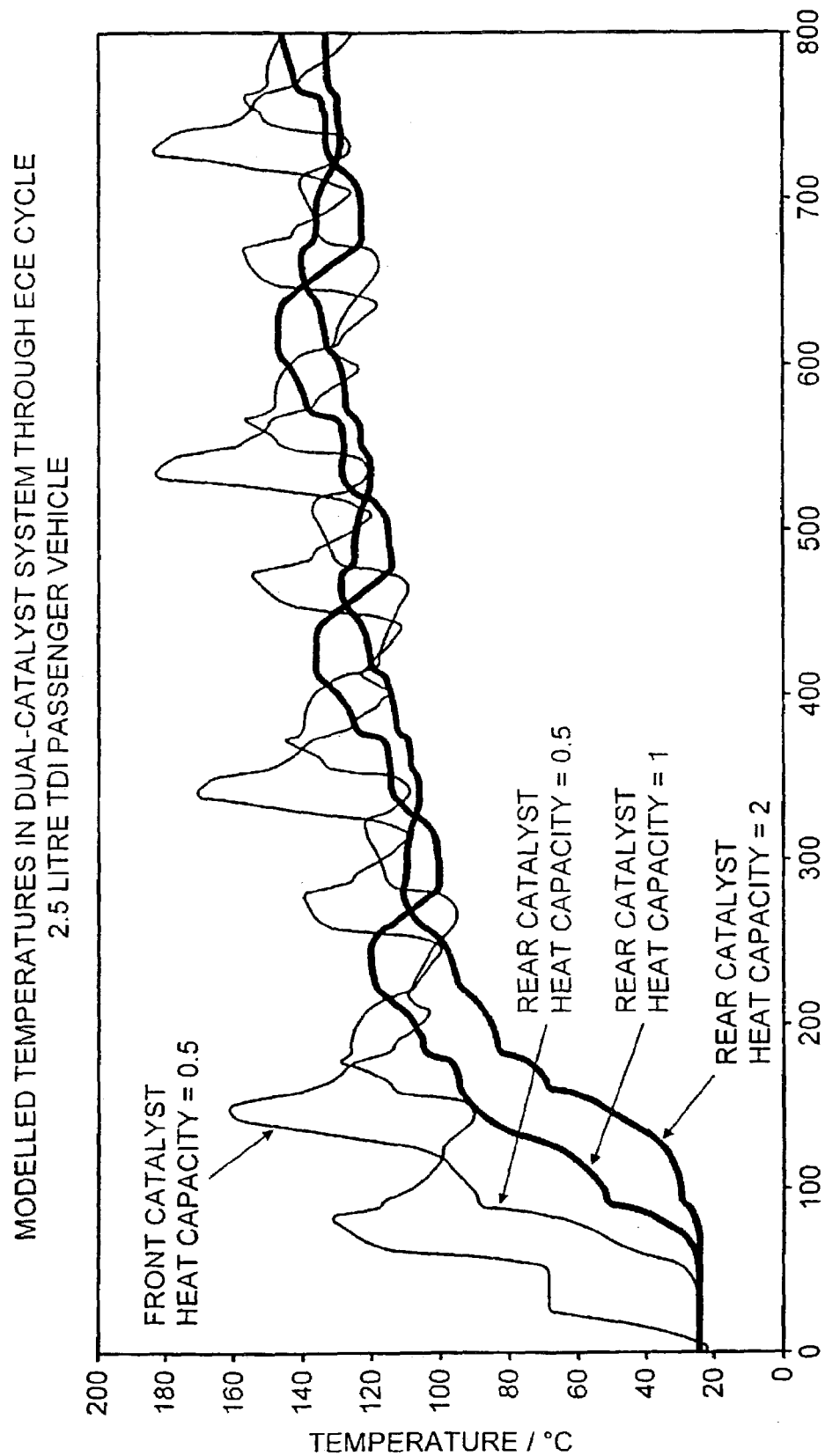
FIG. 2 is a plot of temperature against time, generated by computer modelling of a system according to the invention, compared to other dual-catalyst systems.

FIG. 2 is a plot from computer modelling a two-part catalyst according to the present invention with varying heat capacities (0.5, 1 and 2 arbitrary units), over the ECE test cycle, when connected to a 2.5 litre TDI engine in a passenger vehicle. The importance of a relatively low heat capacity front or upstream catalyst can readily be seen. A relatively high heat capacity rear or downstream catalyst is much slower to heat up, but is more stable in later parts of the cycle.

Figure 3:
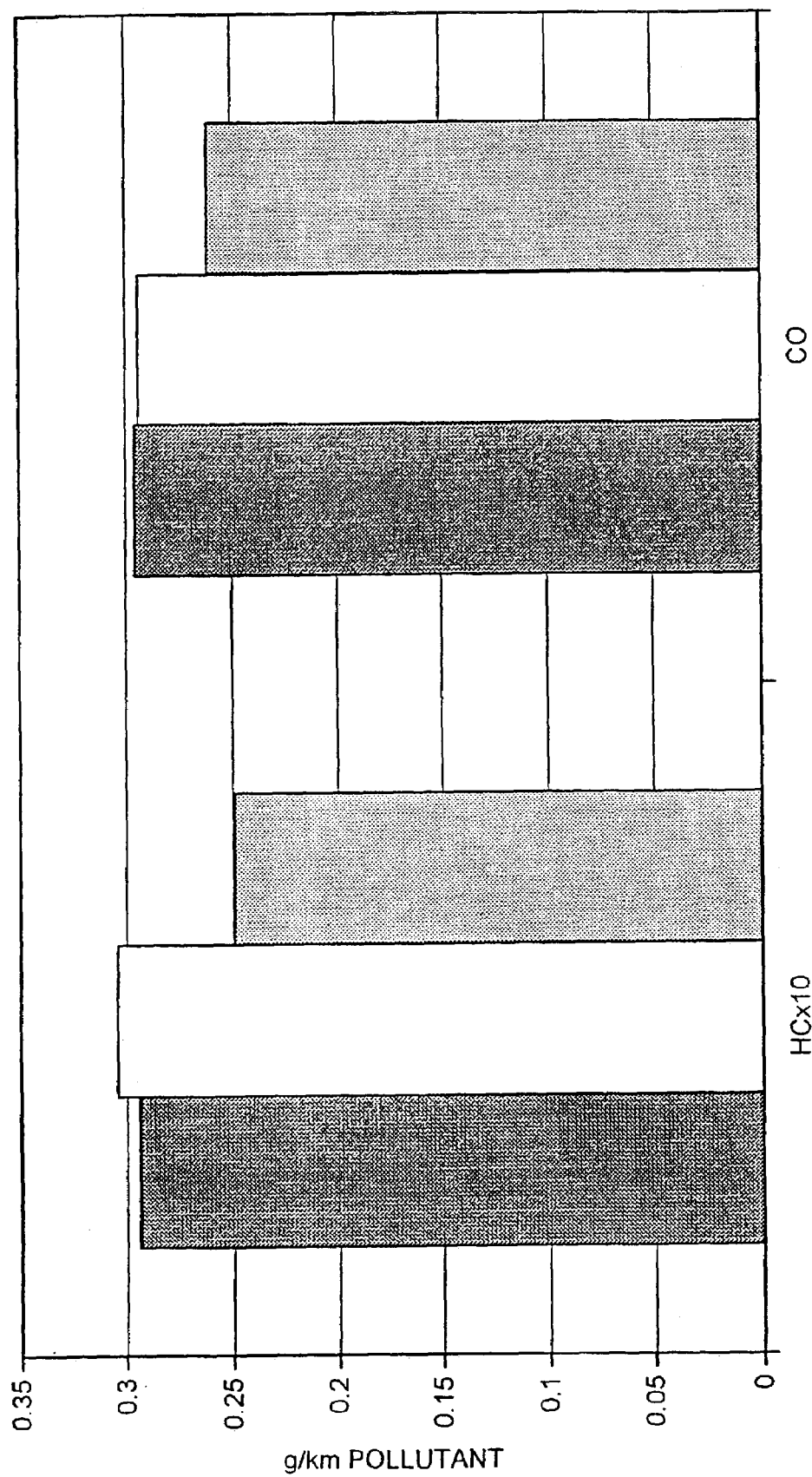
FIG. 3 is a bar chart showing total tailpipe HC and CO for a LDD passenger vehicle run on the MVEG 'A' test cycle for European Stage III compliance comparing the ability of three catalyst arrangements over the cycle.

FIG. 3 shows a bar chart of total tailpipe HC and CO in g/km for three averaged MVEG 'A' tests for European Stage III emissions compliance on a 1.9 litre TDI LDD passenger production vehicle certified to meet European stage III including three diesel oxidation catalyst arrangements, one according to the present invention. The black bar represents the results obtained for a relatively high thermal mass catalyst comprising a commercially available 6-inch long, 400 cpsi cordierite cylindrical flow-through substrate having a diameter at its faces of 4.66 inches and a cell wall thickness of 8 mm (volume 102 in³ corresponding to a 1.7 litres). The total open frontal area was 70.6%. The white bar represents the results obtained for a relatively low thermal mass catalyst having the same dimensions to the relatively high thermal mass catalyst comprising a commercially available 400 cpsi cordierite flow-through substrate with 4 mm cell wall thickness and 84.6% open frontal area. The grey bar represents the results obtained for a catalyst arrangement according to the invention comprising an upstream first part including 2-inches of the relatively low thermal mass substrate described above and a 4-inch length of the relatively high thermal mass substrate mentioned above. In each case the substrate was coated with a gamma-alumina washcoat including a loading of 2.5 g in $^{-3}$ or 255 g for the 1.7 litre total volume. The same loading of platinum salts were impregnated onto each substrate using conventional techniques, e.g. incipient wetness, and the resulting substrate was calcined and aged, also according to known methods. Each catalyst or catalyst combination was packaged in the same manner; insulated in a single can, and the can was inserted into a section of the exhaust system of the production passenger vehicle in exchange for the can/catalyst supplied with the vehicle.

The results show clearly that over the MVEG 'A' cycle the catalyst arrangement according to the invention provides a reduction of approximately 16% for HC and about 13% for CO. This result is extremely significant in view of the need to meet future emissions legislation requirements such as European Stage IV. The results showed good reproduceability across the three tests (not shown), and particular improvement in CO and HC performance was observed during cold-start (up to 400 seconds) and the cooler ECE urban cycle part (400–800 seconds (results not shown)).

The invention claimed is:

1. An oxidation catalyst for a light-duty diesel vehicle comprising a first upstream part having a heat capacity and a second downstream part of higher heat capacity relative to the first part, each part comprising a substrate and a catalyst support coated thereon, wherein at least the substrate of the downstream catalyst part is ceramic and the open cross-sectional area of the second part is greater than the open cross-sectional area of the first part, and wherein the total cross-sectional area of the front face of the second part is greater than the total cross-sectional area of the front face of the first part, wherein the exhaust gas has a longer residence time in the second part than in the first part, and wherein the substrate of the upstream catalyst part is a metal foil having a wall thickness of $\leq 20$ µm.

2. An oxidation catalyst according to claim 1, wherein the heat capacity of the downstream part is at least twice that of the upstream part.

3. An oxidation catalyst according to claim 2, wherein the heat capacity of the downstream part is at least three times that of the upstream part.

4. An oxidation catalyst according to claim 3, wherein the heat capacity of the downstream part is at least four times that of the upstream part.

5. An oxidation catalyst according to claim 1, wherein the cell density of the upstream catalyst part substrate is from 300 cells per square inch (cpsi) to 900 cpsi.

6. An oxidation catalyst according to claim 1, wherein the substrate of the upstream catalyst part is conical or frustoconical in shape and is arranged with the smaller cross section upstream.

7. An oxidation catalyst according to claim 1, wherein the substrate wall thickness of the downstream catalyst part is $\geq 0.10$ mm.

8. An oxidation catalyst according to claim 7, wherein the substrate wall thickness of the downstream catalyst part is $\geq 0.15$ mm.

9. An oxidation catalyst according to claim 1, wherein the cell density of the downstream catalyst part substrate is from 100 to 900 cpsi.

10. An oxidation catalyst according to claim 9, wherein the cell density of the upstream catalyst part substrate is from 300 cells per square inch (cpsi) to 600 cpsi.

11. A light-duty diesel vehicle including an exhaust system comprising an oxidation catalyst according to claim 1.

12. A method of oxidizing at least one of CO and/or HC in an exhaust gas emitted from an engine of a light-duty diesel vehicle comprising contacting the exhaust gas with an oxidation catalyst for a light-duty diesel vehicle comprising a first upstream part having a heat capacity and a second downstream part of higher heat capacity relative to the first part, each comprising a substrate and a catalyst support coated thereon, wherein at least the substrate of the downstream catalyst part is ceramic and the open cross-sectional area of the second part is greater than the open cross-sectional area of the first part, and wherein the total cross-sectional area of the front face of the second part is greater than the total cross-sectional area of the front face of the first part, wherein the exhaust gas is contacted with the second part for a longer residence time than with the first part, and wherein the substrate of the upstream catalyst part is a metal foil having a wall thickness of $\leq 20$ µm.

13. An oxidation catalyst according to claim 12, wherein the cell density of the downstream catalyst part substrate is from 200 to 600 cpsi.

* * * * *